United States Patent [19]

Burshtein

[11] Patent Number: 6,038,577
[45] Date of Patent: Mar. 14, 2000

[54] EFFICIENT WAY TO PRODUCE A DELAYED VERSION OF A MAXIMUM LENGTH SEQUENCE USING A DIVISION CIRCUIT

[75] Inventor: David Burshtein, Herzliyya, Israel

[73] Assignee: DSPC Israel Ltd., Givat Shmuel, Israel

[21] Appl. No.: 09/005,032

[22] Filed: Jan. 9, 1998

[51] Int. Cl.[7] ................................ G06F 7/58; G06F 7/00
[52] U.S. Cl. .......................................... 708/252; 708/492
[58] Field of Search ........................... 364/746.1, 717.03, 364/717.01; 708/492, 250, 252

[56] References Cited

U.S. PATENT DOCUMENTS

| | | | |
|---|---|---|---|
| 5,105,376 | 4/1992 | Pedron | 364/717.03 |
| 5,206,824 | 4/1993 | Arazi | 364/746.1 |
| 5,446,745 | 8/1995 | Gibbs | 364/746.1 |

OTHER PUBLICATIONS

Shift Register Connections for Delayed Versions of m Sequences, A.N. Van Luyn, Electronics Letters, vol. 14, No. 22, Oct. 1978.

A Simple Method for the Determination of Feedback Shift Register Connections for Delayed Maximal Length Sequences, Yiu Proceedings of the IEEE, vol. 68, No. 4, Apr. 1980.

*Primary Examiner*—Tan V. Mai
*Attorney, Agent, or Firm*—Mark M. Friedman

[57] ABSTRACT

Method and apparatus for efficiently producing a delayed version of a maximum length sequence output from a linear feedback shift register. Polynomial (vector) exponentiation is performed instead of matrix exponentiation to calculate the mask coefficients which yield the delayed sequence from the linear feedback shift register. Polynomial (vector) operations are much simpler and faster than the corresponding matrix operations and require substantially less circuitry and computational effort. Modulo exponentiation of polynomials is done by repeated squaring and shifting, and a division circuit built on a linear feedback shift register is provided to perform an efficient modulo squaring of polynomials.

6 Claims, 4 Drawing Sheets

6,038,577

EFFICIENT WAY TO PRODUCE A DELAYED VERSION OF A MAXIMUM LENGTH SEQUENCE USING A DIVISION CIRCUIT

FIELD AND BACKGROUND OF THE INVENTION

The present invention relates to a method and apparatus for producing a delayed version of a sequence of bits, and, more particularly, to a method and apparatus for producing a delayed version of a maximum length sequence output from a linear feedback shift register.

Linear feedback shift registers (LFSR's) are employed in a variety of applications, including generating the pseudo-random spreading codes used in code division multiple access (CDMA) transmission systems. In CDMA systems a need arises to produce a specified maximum length sequence with an arbitrary delay. For example, the receiver's linear feedback shift register must be set up to generate the same pseudo-random spreading code sequence as that of the transmitter. This is a necessary, but not sufficient, condition to enable reception of the transmitted signals. The receiver does this by using the precise transmitter time offset. Thus, an important function which the receiver must perform is to produce the specified maximum length sequence from the linear feedback shift register with an arbitrary delay.

A maximum length sequence of order m is a sequence of $2^m-1$ binary digits (bits) such that the smallest continually repeating pattern within the sequence is the sequence itself. A first maximum length sequence which is delayed by an arbitrary delay value q, such that $0 \leq q < 2^m-1$, is a second maximum length sequence which is identical to the first maximum length sequence, except that the bits of the second maximum length sequence are offset by q bit positions from the corresponding bits of the first maximum length sequence.

A linear feedback shift register of m stages generates certain elements of a finite Galois field of order $2^m$. (A concise summary of linear feedback shift registers is given by Beker and Piper in Cipher Systems, Wiley-Interscience, 1982.) Galois fields of order $2^m$ may be represented by binary polynomials expressed in terms of a polynomial argument, hereinafter denoted as "x", with modulo addition and modulo multiplication defined using a primitive polynomial as the modulus. A primitive polynomial is a polynomial which does not factor and divides $x^T+1$, where $T=2^m-1$. The addition operation on a Galois field of order $2^m$, denoted by '+', is equivalent to the binary exclusive-OR operation. Multiplication by x in a Galois field of order $2^m$ is a modulo left-shift of the binary digits representing the polynomial multiplicand. All the $2^m-1$ non-zero elements of a Galois field of order $2^m$ may be produced by successive powers of a particular element, usually chosen to be x. With the inclusion of the zero element, there are thus a total of $2^m$ elements in such a field.

FIG. 1 illustrates the prior art Galois form of a linear feedback shift register. The m stages of the LFSR are flip-flops containing the states of the m terms of the polynomial representing the current state. The zero-order term of the state $a_0$ is a flip-flop 14, the $\alpha_{m-2}$ term is a flip-flop 12, and the $\alpha_{m-1}$ term is a flip-flop 10. The ellipsis . . . indicates intermediate stages not shown, and it is understood that the descriptions illustrated here for the stages shown also apply to the stages not shown. The corresponding polynomial that is represented by that state is $\alpha_0 x^{m-1} + \ldots + \alpha_{m-1} x^0$. The LFSR sequence output 19 is $a_0$ from flip-flop 14, which is also fed to a series of weighted taps 18, 20, and 22. The weights are either 0 or 1, and represent the coefficients of a generator polynomial. For example, tap 18 is set according to the coefficient $g_1$, tap 20 is set according to the coefficient $g_2$, and tap 22 is set according to the coefficient $g_{m-1}$. If the generator polynomial is a primitive polynomial over the Galois field, then the output of the LFSR will be a maximum length sequence. Each bit position of the sequence output corresponds to a clock pulse, and all flip-flops receive input clock pulses simultaneously on a common line 17. Each flip-flop stores the value input therein at each successive clock pulse and presents the value stored therein as an output to the next flip-flop. Between pairs of flip-flops are modulo 2 adders 16 which combine the weighted sequence output of the LFSR with the output from the previous flip-flop of the pair. Each successive bit position of a sequence output from a linear feedback shift register corresponds to a successive state of the linear feedback shift register, which in turn corresponds to a successive clock pulse by which the state of the linear feedback shift register is advanced. The present application uses the term "clock time" to denote the integer which represents the number of a particular clock pulse. Clock time is used to reference the state of a linear feedback shift register as well as a bit position within a particular sequence.

The state of a linear feedback shift register at a clock time k is specified by the states of the flip-flops $\alpha_0, \alpha_1, \ldots, \alpha_{m-2}, \alpha_{m-1}$, at clock time k. These states may be preset at state inputs 11, 13, and 15. The state may be written as a column vector:

$$a = [\alpha_0 \alpha_1 \ldots \alpha_{m-2} \alpha_{m-1}]^T \qquad (1)$$

It is noted that mathematically, a polynomial may be represented as a vector, and for computational purposes in this field of art, the two forms are often interchanged. The elements of a vector are generally referred to as "components," whereas the equivalent elements in the polynomial are the "coefficients" of the powers of the variable used in the polynomial. Therefore, the present application uses the terms "component" and "coefficient" to refer equivalently to the same computational entity, whether in respect to a vector or to a polynomial.

The sequence of bits in the sequence output from a linear feedback shift register is determined by the settings of the weighted taps and the initial state. The trivial initial state of a=0 will generate the trivial sequence of all zeros (a zero output with a period of one). Different non-trivial initial states will generate the same sequence of bits, although the outputs for different non-trivial initial states will be delayed by different amounts. The trivial sequence is of no interest, and therefore the present application hereinafter uses the term "initial state" to denote one of the $2^m-1$ non-trivial initial states. The sequence of bits output from a linear feedback shift register has the maximum period of $2^m-1$ if the weighted taps correspond to the coefficients of a primitive polynomial. Primitive polynomials always have $g_0 = g_m = 1$, and therefore the weighted taps corresponding to the respective coefficients are simply direct connections. A sequence of maximum period is referred to as a maximum length sequence, or an m-sequence. For a linear feedback shift register whose weighted taps are set up to generate an m-sequence, the $2^m-1$ different initial states will generate the m-sequence with every one of the $2^m-1$ possible delays.

If the state of a linear feedback shift register at a clock time l is denoted by $a^{(l)}$, then the following recursion holds:

$$a^{(l+1)} = M a^{(l)} \qquad (2)$$

where M is the transition matrix $$M = \begin{bmatrix} g_{m-1} & 1 & 0 & \cdots & 0 \\ g_{m-2} & 0 & 1 & \cdots & 0 \\ \vdots & \vdots & \vdots & \vdots & \vdots \\ g_1 & 0 & \cdots & 0 & 1 \\ 1 & 0 & \cdots & 0 & 0 \end{bmatrix} \quad (3)$$

One way to produce a delayed version of a sequence is to use a linear feedback shift register with a mask that multiplies the cell values of the linear feedback shift register according to a plurality of inputs corresponding to the stages of the linear feedback shift register. That is, a linear feedback shift register of m stages will utilize a mask with m inputs. FIG. 2 illustrates the prior art use of such a linear feedback shift register with a mask, which is implemented by a plurality of AND gates 26. Each of the AND gates 26 has an input from each output of the m flip-flops which make up the LFSR. The other inputs of AND gates 26 are the mask coefficients $b_{m-1}, b_{m-2}, \ldots b_1$, and $b_0$. The outputs of AND gates 26 are fed into a binary adder 28, whose output is c. The output c is the same as the sequence output of the LFSR except that it is delayed by a certain amount. For example, a simple but importance case is $b^{(0)}=[1 0 \ldots 0 0]^T$ ($b_0=1$ and $b_1=b_2= \ldots =b_{m-2}=b_{-1}=0$). For this case, the output c will be the same as $\alpha_0$; that is, there will be no delay. The problem of producing an arbitrary delay, therefore, becomes that of selecting the mask components $b_0, b_1, b_2, \ldots, b_{m-2}$, and $b_{m-1}$ which will produce the desired arbitrary delay.

For conceptual simplicity in developing the mathematical formalism, the present application uses negative values of delay. A negative delay is an advance, so the problem is transformed into finding the mask $b^{(q)}$ which yields the sequence advanced by q clock pulses. Since the sequence is periodic, searching for a time offset can be done either by a delay or by an advance. If the sequence length is $2^m-1$ (such as for a maximum length sequence), an advance of q and a delay of $2^m-1-q$ produce the same result. The present application uses the term "offset" to denote an integer number of bit positions by which one sequence is delayed with respect to another otherwise identical sequence, but without regard to which of the two sequences has been delayed. Thus, an advance of q bit positions and a delay of q bit positions are both offsets of q bit positions.

Starting from the state $a^0$, the linear feedback shift register state advanced by q clock pulses from $a^0$ is $a^{(q)}$, which can be found by iterating Equation (2), and using the matrix of Equation (3):

$$a^{(q)} = M^q a^{(0)} \quad (4)$$

Because the output is from $a_0$, the advanced output will be given by $$\alpha_0^{(q)}[1 0 \ldots 0 0] M^q a^{(0)} \quad (5)$$

Hence, the mask $b^{(q)}$ for the sequence advanced by q is obtained by:

$$b^{(q)} = \begin{bmatrix} b_0^{(q)} & b_1^{(q)} & \cdots & b_{m-1}^{(q)} \end{bmatrix}^T = (M^T)^q \begin{bmatrix} 1 \\ 0 \\ \vdots \\ 0 \end{bmatrix} \quad (6)$$

The method of Equation (6), that of matrix exponentiation, is the current prior art method of obtaining the mask $b^{(q)}$ for an arbitrary clock time advance of q clock pulses. That is, to obtain the mask for an arbitrary advance of q clock pulses, it is sufficient to raise the transpose matrix $M^T$ to the power q, because the desired mask $b^{(q)}$ is simply the first column of $(M^T)^q$. Toward this end, certain improvements have been made in implementing matrix exponentiation. For example, U.S. Pat. No. 5,532,695 discloses a circuit arrangement for fast matrix multiplication. Nevertheless, matrix multiplication still involves considerable computation. When this is compounded by the need to raise a matrix to a power, the computation burden is correspondingly increased, even for efficient algorithms, and is a barrier to increased performance.

There is thus a widely recognized need for, and it would be highly advantageous to have, a method which efficiently produces a version of a maximum length sequence output of a linear feedback shift register with an arbitrary delay. This goal is met by the present invention.

SUMMARY OF THE INVENTION

According to the present invention there is provided a method and apparatus for efficiently obtaining a delayed version of a maximum length sequence from a linear feedback shift register. The efficiency is obtained by avoiding the need for matrix exponentiation, and by performing a polynomial exponentiation instead. A polynomial exponentiation is equivalent to a vector exponentiation, and it can readily be seen that the computational complexity is less than that of matrix exponentiation. For an m-stage LFSR, the matrix has $m^2$ elements and therefore requires a computational effort proportional to $m^2$, whereas the polynomial has only m elements and therefore requires computational effort proportional to m. Such a computation is especially well-suited to the polynomials of Galois fields of order $2^m$, particularly because the circuitry to implement algebraic operations on the elements of Galois fields of order $2^m$ is very simple. Furthermore, methods of fast exponentiation, including the method of exponentiation by repeated squaring and multiplication, are well-known in the art.

Therefore, according to the present invention there is provided a method for producing an offset of q bit positions in a sequence of bits output from a linear feedback shift register having m stages and a plurality of weighted taps, the weights of the weighted taps being determined by a generator polynomial having a polynomial argument of x, the method including the steps of: (a) providing a linear feedback shift register with a mask, the mask having inputs; (b) calculating the coefficients of x raised to a power modulo the generator polynomial; and (c) inputting the coefficients into the inputs.

In order to derive the steps of the method, it is necessary to transform the problem to the sequence output from a conjugate linear feedback shift register in the Fibonacci form. From that perspective, the polynomial exponentiation and multiplication operations are more readily apparent. Polynomial exponentiation is performed by repeated squaring and advancing of the linear feedback shift register, as is well-known in the art. Efficient squaring of a polynomial in the Galois field of order $2^m$ may be done by a modified Galois form linear feedback shift register hereinafter referred to in the present application as a "division circuit." Combinations of squaring by the division circuit and advancing of a linear feedback shift register perform the polynomial exponentiation required to generate the mask that produces the desired delay of the maximum length sequence.

Therefore, according to the present invention there is also provided an improved linear feedback shift register for producing an offset in a sequence of bits, the linear feedback shift register having a plurality of stages, a plurality of modulo 2 dders, and a plurality of weighted taps, the improvement including: (a) a mask having inputs; and (b) a mechanism for calculating the inputs to the mask, wherein the mechanism is operative to calculating a power of a polynomial.

While the invention has been described with respect to a limited number of embodiments, it will be appreciated that many variations, modifications and other applications of the invention may be made.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a method and apparatus which can be used to generate an arbitrarily delayed version of a sequence of bits output from a linear feedback shift register.

The principles and operation of the method and apparatus according to the present invention may be better understood with reference to the drawings and the accompanying description.

Figure 3:
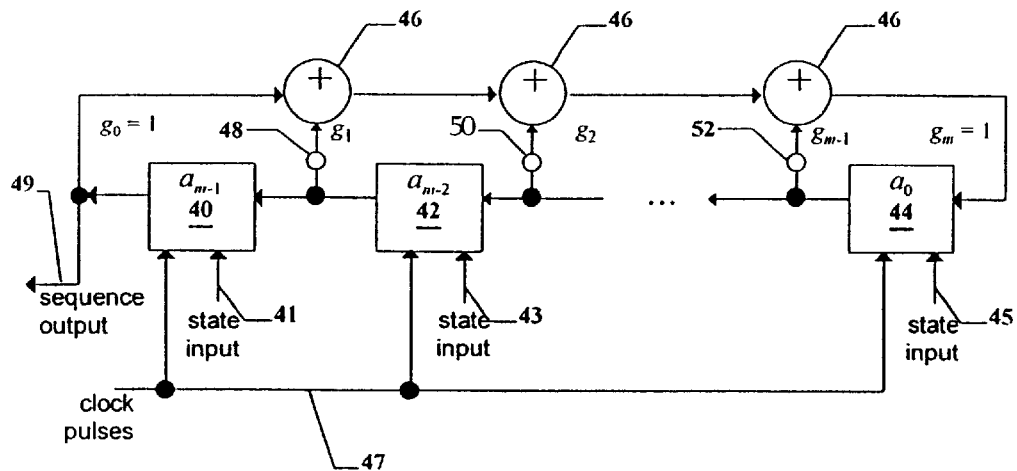
FIG. 3 shows the Fibonacci form linear feedback shift register, or conjugate linear feedback shift register.

FIG. 3 illustrates the prior art Fibonacci form of a linear feedback shift register. This form is said to be "conjugate" to the Galois form illustrated in FIG. 1, and is also referred to a conjugate linear feedback shift register (CLFSR). As in the Galois form, the m stages of the CLFSR are flip-flops containing the states of the m terms representing the current state. The zero-order term $\alpha_0$ is a flip-flop 44, the $\alpha_{m-2}$ term is a flip-flop 42, and the $\alpha_{m-1}$ term, which provides the sequence output 49 of the CLFSR, is a flip-flop 40. The ellipsis . . . indicates intermediate stages not shown, and it is understood that the descriptions illustrated here for the stages shown also apply to the stages not shown. The outputs of the flip-flops are fed into weighted taps 52, 50, and 48, respectively as well as to the subsequent flip-flops. The weights of these weighted taps are either 0 or 1, and represent the coefficients of a primitive polynomial over the Galois field. For example, tap 48 is set according to the coefficient $g_1$, tap 50 is set according to the coefficient $g_2$, and tap 52 is set according to the coefficient $g_{m-1}$. All flip-flops receive input clock pulses simultaneously on a common line 47, and each flip-flop stores the value input therein at each successive clock pulse and presents its stored value as its output, which is the input to the next flip-flop. The states of the flip-flops may be set using state inputs 41, 43, and 45.

As is well-known in the art, Galois form and the Fibonacci form produce identical sequences if their tap weights are the same. For a given initial state, however, the sequences these two forms produce are not necessarily synchronized, but may have a respective delay. The Galois form is more commonly used than the Fibonacci form, but the Fibonacci form is of theoretical importance, and is utilized as an intermediate step in the derivation of the present invention.

The CLFSR satisfies the following recursion relationship:

$$a^{(l+1)} = M^T a^{(l)} \qquad (7)$$

where M is the matrix of Equation (3). Note that it is the transpose of M which is applicable to the Fibonacci form CLFSR:

$$M^T = \begin{bmatrix} g_{m-1} & g_{m-2} & \cdots & g_2 & g_1 & 1 \\ 1 & 0 & \cdots & 0 & 0 & 0 \\ 0 & 1 & \cdots & 0 & 0 & 0 \\ \vdots & \vdots & \vdots & \vdots & \vdots & \vdots \\ 0 & 0 & \cdots & 1 & 0 & 0 \\ 0 & 0 & \cdots & 0 & 1 & 0 \end{bmatrix} \qquad (8)$$

Thus, recalling Equation (6), the desired mask $b^{(q)}$ is obtained by first initializing the CLFSR with $a^{(0)} = [10 \ldots 00]^T$ and then advancing the CLFSR by q clock pulses. The mask $b^{(q)}$ is then the state of the CLFSR at that time. That is, $$b_j^{(q)} = \alpha_{m-1}^{(q+m-1-j)} j = 0, 1, \ldots, m- \qquad (9)$$

To efficiently advance the CLFSR use is made of the fact that the sequence output from the Galois form LFSR is identical to the sequence output from the Fibonacci CLFSR, with a possible delay. To avoid the delay, it is possible to set the initial state of the Galois form LFSR to $a^{(0)} = [00 \ldots 01]^T$ and thereby obtain the result that the sequence produced by the LFSR (initialized with $[00 \ldots 01]^T$) at $a_0$ is identical to the sequence produced by the CLFSR (initialized with $[10 \ldots 00]^T$) at $a_{m-1}$. Hence $$b_j^{(q)} = \alpha_0^{(q+m-1-j)} j = 0, 1, \ldots, m-1. \qquad (10)$$

Thus, the problem of determining the mask $b^{(q)}$ from Equation (10) is reduced to the problem of efficiently calculating the value of x raised to the power of q modulo the generator polynomial, $x^q \mod g(x)$, where $g(x)$ is the generator polynomial used for the LFSR:

$$g(x) = 1 + g_1 x + g_2 x^2 + \ldots g_{m-1} x^{m-1} \qquad (11)$$

Once $x^q \mod g(x)$ has been obtained, the LFSR is advanced by m−1 additional steps to obtain $b^{(q)}$ according to Equation (10).

It is noted at this point that the CLFSR is useful only in the foregoing theoretical derivation of determining an efficient way of calculating the mask $b^{(q)}$. The CLFSR is not needed for any computations, and hereinafter will not be utilized.

As is well-known in the art, exponentiation can be performed by repeated squaring and multiplication. To calculate $x^q$, first obtain the binary representation of q:

$$q = q_0 2^{1-l} + q_1 2^{m12} + \ldots + q_{1.1} \text{ where } 1 \leq m \text{ and } q_0 = 1 \qquad (12)$$

Then, $$x^q = \left(\cdots\left(\left((x^{q_0})^2 \cdot x^{q_1}\right)^2 \cdot x^{q_2}\right)^2 \cdots\right)^2 \cdot x^{q_{m-1}} \quad (13)$$

A "next state operation" N implements the multiplication of a polynomial by x modulo the generator polynomial as in Equation (13):

$$N(f) = x \cdot f \bmod g(x) \quad (14)$$

where f is the polynomial represented by the current state of the LFSR. This simply advances the LFSR by one clock pulse.

A "squared value operation" S calculates the square of a polynomial modulo the generator polynomial as in Equation (13):

$$S(f) = f^2 \bmod g(x) \quad (15)$$

where f is the polynomial represented by the current state of the LFSR. To perform an efficient squared value operation on $f = f_0 x^{m-1} + f_1 x^{m-2} + \ldots + f_{m-1} x^0$, it is noted that:

$$f^2 = f_0 x^{2m-2} + f_1 x^{2m-4} + \ldots + f_{m-1} x^0 \quad (16)$$

The right-hand side of Equation (16) can be easily seen, since the cross-terms which result from the squaring of f occur in pairs, and the properties of addition in Galois fields of order $2^m$ are such that these pairs of cross-terms will cancel, leaving only the terms in $x^{2m-2}$, $x^{2m-4}$, and so forth. Furthermore, the properties of multiplication in Galois fields of order $2^m$ are such that $(f_i)^2 = f_i$ for all the coefficients of f. It is noted that the right-hand side of Equation (16) has only even powers of x. Therefore, to calculate S(f), it is sufficient to input an expanded sequence input $f_{m-1}, 0, f_{m-2}, 0, \ldots f_1, 0, f_0$ into a division circuit, which is a linear feedback shift register that has been modified according to the present invention.

Figure 1:
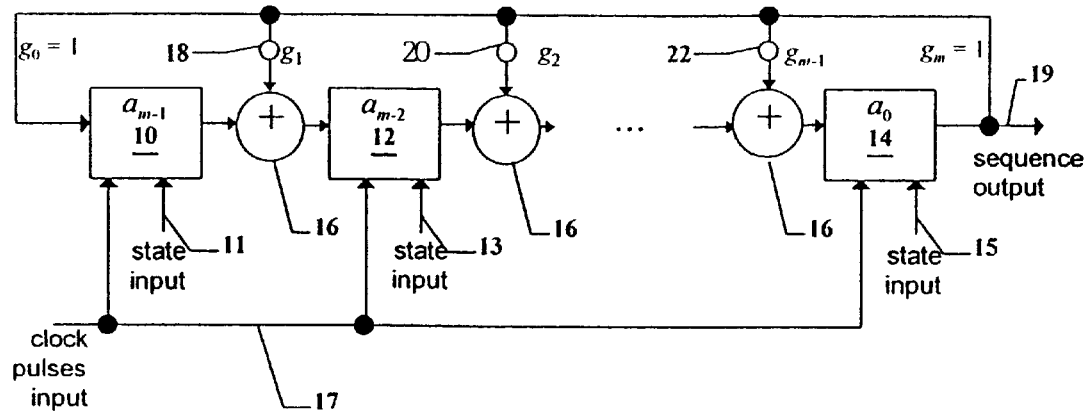
FIG. 1 shows the Galois form linear feedback shift register.
Figure 4:
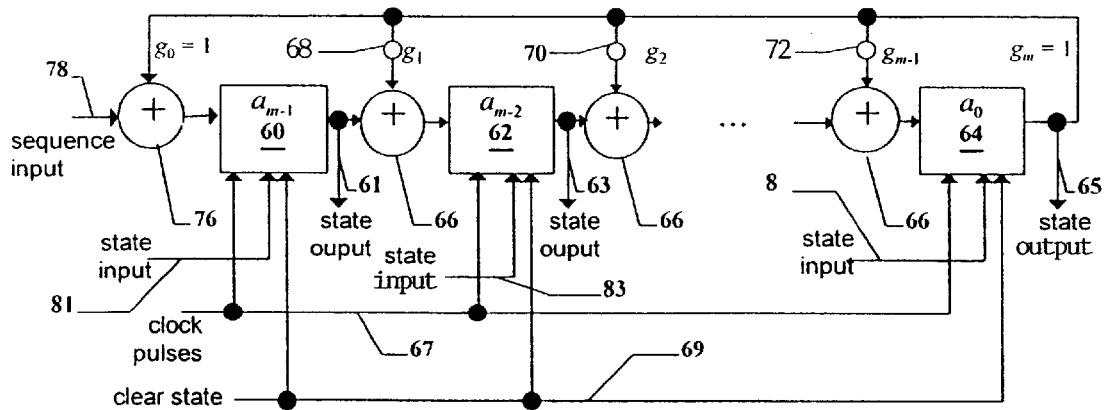
FIG. 4 shows a division circuit for squaring a polynomial.

FIG. 4 illustrates a division circuit according to the present invention for the purpose of calculating the square of an arbitrary polynomial, that is, a polynomial with arbitrary coefficients. It is similar in structure to the Galois form of the linear feedback shift register as shown in FIG. 1, but it is employed differently and innovates a sequence input 78 instead of a sequence output as in the LFSR and CLFSR. The m stages of the division circuit are flip-flops containing the states of the m terms of the polynomial representing the temporary division result. The zero-order term $\alpha_0$ is a flip-flop 64, the $\alpha_{m-2}$ term is a flip-flop 62, and the $\alpha_{m-1}$ term is a flip-flop 60. The ellipsis . . . indicates intermediate stages not shown, and it is understood that the descriptions illustrated here for the stages shown also apply to the stages not shown. Sequence input 78 is put into a modulo 2 adder 76 which adds the input to the output from flip-flop 64, which is also fed to a series of weighted taps 68, 70, and 72. The weights are either 0 or 1, and represent the coefficients of the same primitive polynomial over the Galois field that is used to generate the maximum length sequence with the linear feedback shift register as shown in FIG. 1. For example, tap 68 is set according to the coefficient $g_1$, tap 70 is set according to the coefficient $g_2$, and tap 72 is set according to the coefficient $g_{m-1}$. All flip-flops receive input clock pulses simultaneously on a common line 67, and each flip-flop stores the value input therein at each successive clock pulse and presents its stored value as its output. Between pairs of flip-flops are modulo 2 adders 66 which combine the weighted output of flip-flop 64 with the output from the previous flip-flop of the pair. Each uccessive state of the division circuit corresponds to a successive clock pulse by which the state of the division circuit is advanced. The states of the flip-flops may be set by putting the proper signals on state inputs 81, 83, and 85. Further features of the division circuit include state outputs 61, 63, and 65 for reading the state of the polynomial, and a clear state line 69 common to all the flip-flops and which is provided for resetting the state of the linear feedback shift register by resetting or clearing each flip-flop to zero (0).

Figure 5:
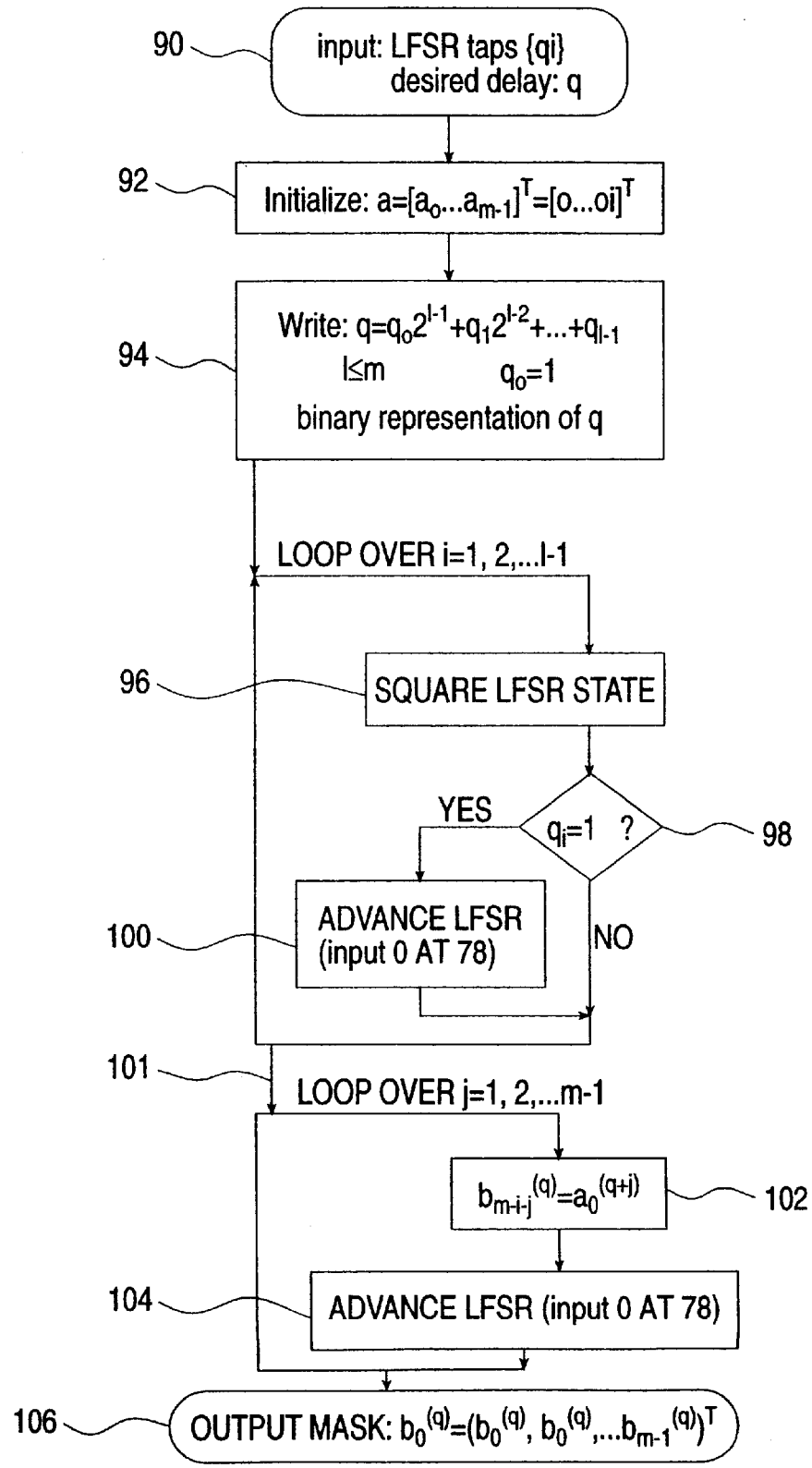
FIG. 5 shows a block diagram how the division circuit of FIG. 4 could be operated in order to obtain the mask

FIG. 5 shows how the division circuit illustrated in FIG. 4 should be operated in order to obtain the mask components. First, the LFSR taps $\{g_i\}$ which correspond to elements 68, 70, intermediate stages, and 72 in FIG. 4 and the desired delay q are inputted (box 90). The initial state is set so that the $a_{m-1}$ term is 1 while the other terms are 0 (box 92). This initial state avoids a delay between sequence outputs from a CLFSR and a LFSR as explained above. Note that the terms of a state are represented in FIG. 4 by flip flops 60, 62, intermediate stages, and 64. The delay q is expanded into its binary representation $q = q_0 2^{1-1} + q_1 2^{m12} + \ldots + q_{1-1}$ where $1 \leq m$ and $q_0 = 1$ (box 94). In order to obtain a result equivalent to equation 13, the operations represented by boxes 96, 98 and 100 are performed 1—1 times. First the current LFSR state is squared (box 96). If the next q coefficient ($q_1$) is 1 (box 98), $x^{q_i} = x$, a next state operation must be performed (box 100) prior to subsequent squaring. The next state operation is accomplished by inputting a zero at the sequence input 78 of FIG. 4. Otherwise, $x^{q_i} = x^0 1$, and an additional squaring (box 96) can be performed without any intermediate operations. The assignment is performed m−1 times. After each assignment, the division circuit of FIG. 4 is advanced by inputting a 0 at the sequence input (78 in FIG. 4, box 104 in FIG. 5). Once all the mask terms are obtained (box 106 in FIG. 5), the mask terms are inputted to produce the desired delay.

Figure 6:
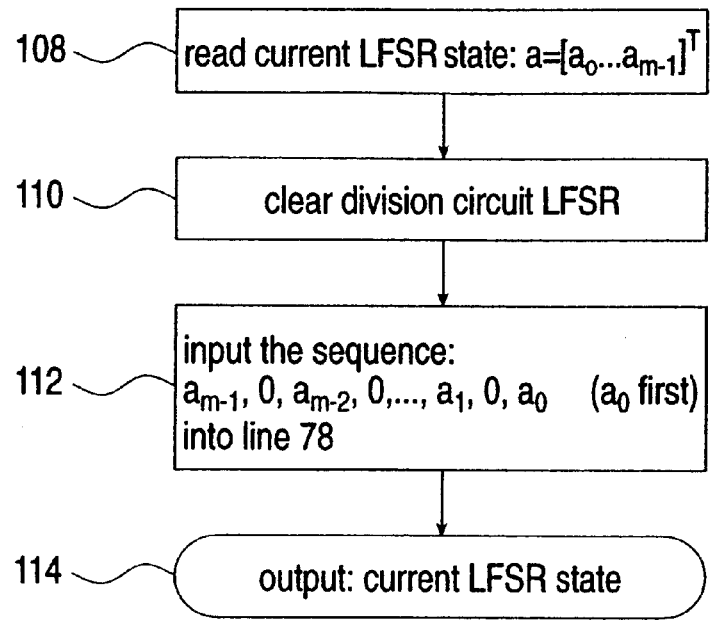
FIG. 6 shows a block diagram for implementing the squaring operation.

The squaring function (box 96 of FIG. 5) may be implemented as per FIG. 6. The current LFSR state is read from state outputs 61, 63, and 65 (in FIG. 4) as per box 108. The division circuit of FIG. 4 is cleared by asserting a signal on clear state line 69 (box 110). The expanded sequence $a_{m-1}$, 0, $a_{m-2}$, 0, . . . , $a_1$, 0, $a_0$ is inputted into sequence input 78 with $a_0$ being inputted first (box 112). The expanded sequence input of a polynomial is a sequence which has twice as many bits as the polynomial and which alternates the coefficients of the polynomial with 0. With each bit of the sequence, a clock pulse is put into line 67. When the entire expanded sequence input has been input, the squared values are read from state outputs 61, 63, and 65 (box 114).

Figure 7:
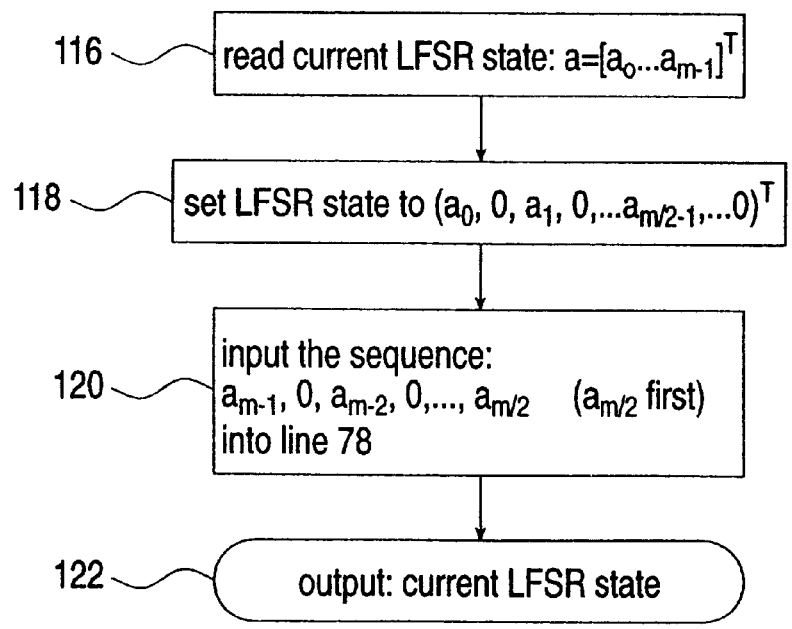
FIG. 7 shows a block diagram illustrating another implementation of the squaring operation.

In another embodiment, shown in FIG. 7. the LFSR state is initialized to $a_0$, 0, $a_1$, 0, . . . $a_{m/2-2}$ 0, $am_{/2-1}$, 0 (box 118) and the sequence $a_{m-1}$, 0, $a_{m-2}$, 0, . . . , $a_{m/2}$ is inputted into sequence input 78 with $a_{m/2}$ inputted first into box 120.

In an embodiment of the present invention, the division circuit is first cleared by asserting a signal on clear state line 69, and then putting the expanded sequence input $f_{m-1}$, 0, $f_{m-2}$, 0, . . . , $f_1$, 0, $f_0$ into sequence input 78. The expanded sequence input of a polynomial is a sequence which has twice as many bits as the polynomial and which alternates the coefficients of the polynomial with 0. With each bit of the sequence, a clock pulse is put onto line 67. When the entire expanded sequence input has been input, the value S(f) is read from state outputs 61, 63, those of the intermediate stages not shown, and 65. In another embodiment, the state of the division circuit can be initialized to the values of 0, $f_{m/2-1}$, 0, $f_{m/2-2}$, 0, . . . , $f_1$, 0, $f_0$ and then input the sequence $f_{m-1}$, 0, $f_{m-2}$, 0, . . . , $fm_{m/2}$. (For notational simplicity, it is assumed that m is even here.)

Figure 2:
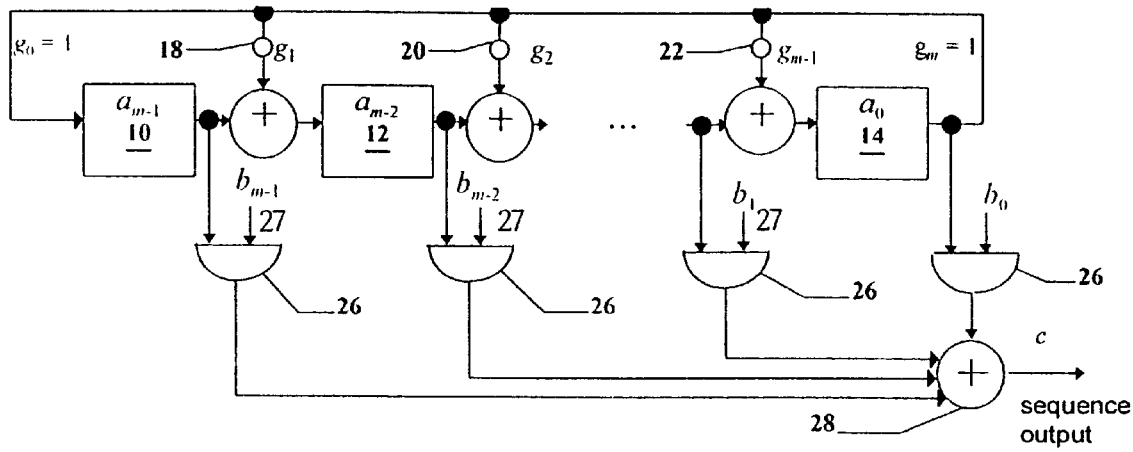
FIG. 2 shows the use of a mask to produce a delayed output from a Galois form linear feedback shift register.

Once $x^q$ mod g(x) has been obtained, it is necessary to apply m−1 additional next state operations N(f) to obtain the mask $b^{(q)}$ according to Equation (10). When the mask $b^{(q)}$ has been obtained, the mask components are input into the delayed output linear feedback shift register, as illustrated in FIG. 2. The resulting sequence has the desired delay.

While the invention has been described with respect to a limited number of embodiments, it will be appreciated that variations, modifications and other applications of the invention may be made.

What is claimed is:

1. A method for producing an offset of q bit positions in a sequence of bits output from a linear feedback shift register having m stages and a plurality of weighted taps, the weights of the weighted taps being determined by a generator polynomial having a polynomial argument of x, the method comprising the steps of:

(a) providing a linear feedback shift register with a mask, said mask having inputs;

(b) calculating the coefficients of x raised to a power modulo the generator polynomial, wherein said step of calculating comprises:

(1) calculating the square of a polynomial modulo the generator polyomial; and (2) calculating the product of a polynomial having a polynomial argument multiplied by said polynomial argument; and (c) inputting said coefficient into said inputs.

2. The method as in claim 1, wherein said power equals q.

3. The method as in claim 1, further comprising the step of:

(d) shifting said linear feedback shift register by m−1 shifts.

4. The method as in claim 1, wherein the offset is selected from the group consisting of an advance and a delay.

5. The method as in claim 1, wherein the generator polynomial is a primitive polynomial.

6. The method as in claim 1, wherein the sequence of bits is a maximum length sequence.

* * * * *